Jan. 12, 1960
C. B. ANDERSON
2,920,606
BRINE SHRIMP HATCHERY AND SEPARATOR
Filed May 8, 1956
2 Sheets-Sheet 1
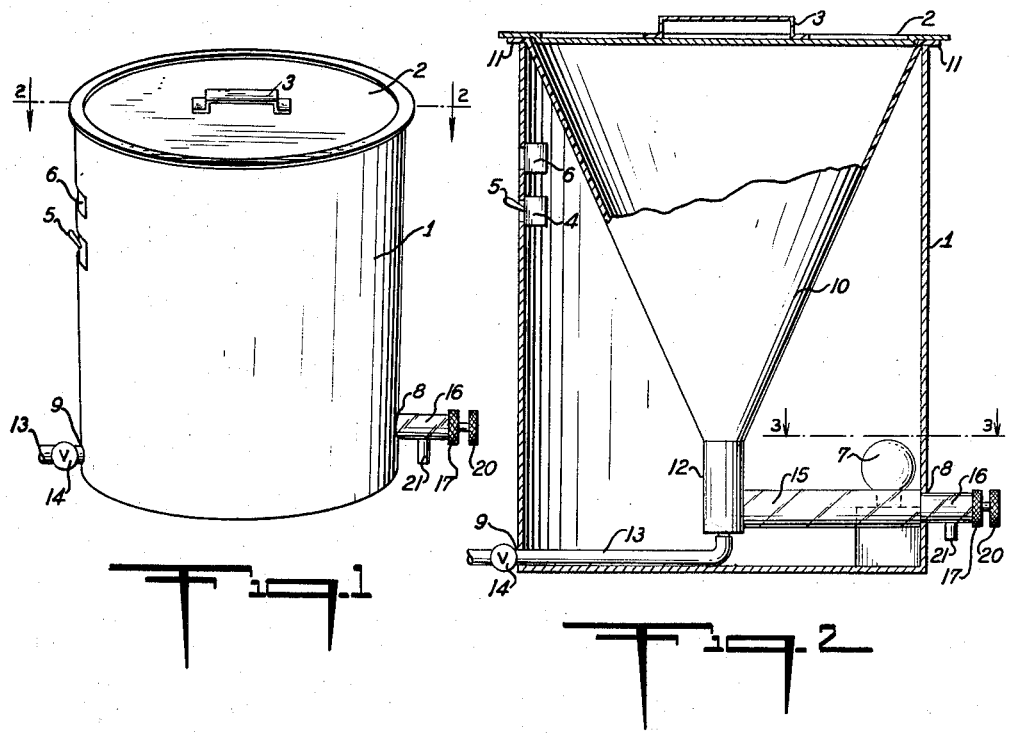
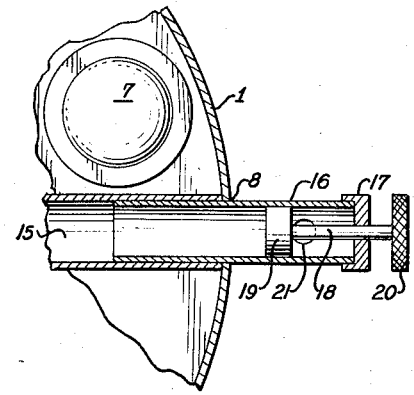
INVENTOR:
CHARLES B. ANDERSON,
BY Smith, Michael & Gardiner,
ATTORNEYS.

Jan. 12, 1960 C. B. ANDERSON 2,920,606
BRINE SHRIMP HATCHERY AND SEPARATOR
Filed May 8, 1956 2 Sheets-Sheet 2
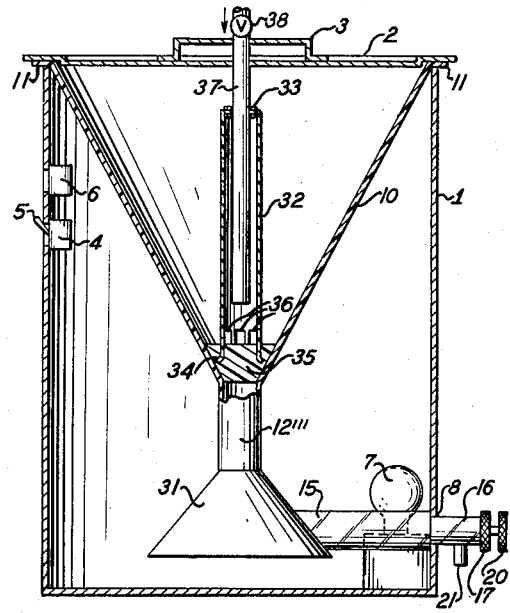
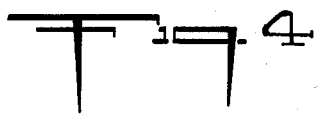
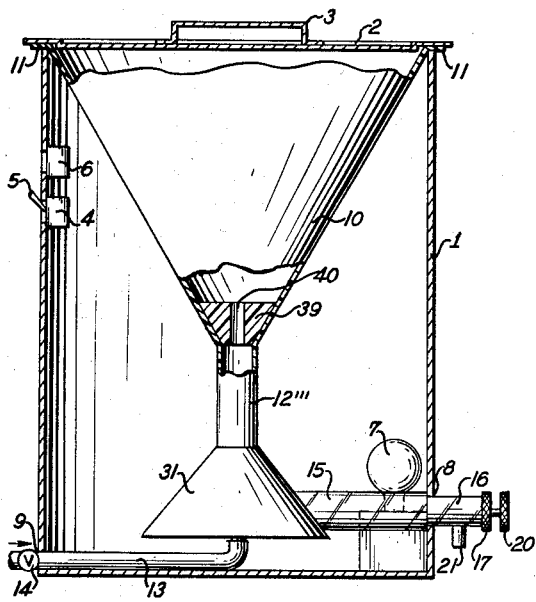
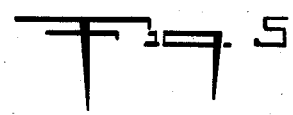
INVENTOR:-
CHARLES B. ANDERSON,
BY Smith, Michael & Gardiner,
ATTORNEYS.

United States Patent Office 2,920,606
Patented Jan. 12, 1960

2,920,606

BRINE SHRIMP HATCHERY AND SEPARATOR

Charles B. Anderson, Fort Worth, Tex.

Application May 8, 1956, Serial No. 583,517

12 Claims. (Cl. 119—2)

My present invention relates to a brine shrimp hatchery and separator, and has particular reference to an apparatus for use by the average aquarist or fish hobbyist for hatching brine shrimp eggs and for separating the egg shells from the hatched brine shrimp.

Many species of fish, both of the fresh water and marine variety, have decided carnivorous instincts, and it is now recognized by aquarists and fish hobbyists that live food is by far the most attractive, appealing and nutritious food available for tropical and other varieties of fish usually kept in aquariums and like containers. Of the various live foods available for the feeding of fish, particularly for the feeding of small or newly-hatched or "baby" fish, newly-hatched brine shrimp have been found to be the best, because of their small size, their great nutritive value, and their appeal to the gluttonous instincts of the fish. While brine shrimp eggs are readily available for purchase on the open market from a number of firms who specialize in gathering, drying and supplying such eggs, no really satisfactory apparatus has been available which meets the requirements of the aquarist or fish hobbyist and which serves as a simple and effective means for hatching brine shrimp eggs and for separating the egg shells therefrom, and the provision of such an apparatus, highly efficient in the purposes for which designed, is the primary object of my present invention.

It is an object of my present invention to provide a relatively simple, composite apparatus in which brine shrimp eggs may be placed and within which they are subjected to the proper degrees of aeration, agitation and temperature to insure complete and relatively rapid hatching of the brine shrimp eggs, and in which the newly-hatched shrimp may be quickly and effectively separated from the egg shells from which they are hatched.

It is an object of my present invention to provide a combined brine shrimp hatchery and separating apparatus adapted to contain a brine solution into which the brine shrimp eggs may be immersed, which apparatus comprises a first container constituting a hatching section, a second container constituting a settling section, and a third container constituting a separating section all disposed within a suitable outer container, and to associate with these several containers, means and temperature-responsive controls for establishing and maintaining the desired temperature of the brine solution to insure hatching of the brine shrimp eggs, and means for supplying air under pressure to the aqueous brine solution and to the brine shrimp eggs therein to effect the desired aeration and agitation of the same.

It is a further object of my present invention to provide a device of the character above described in which a source of light, such as an incandescent light bulb is disposed within the outer casing or container in heat-exchange relation with the first container to heat the aqueous brine solution and the brine shrimp eggs therein to the desired hatching temperature, and in which the third container is transparent or translucent and is adjacent the said source of light, so that the hatched shrimp, due to their inherent natural tendency to be attracted by light, will pass from the second container into the third container from which they may be readily removed from the apparatus through the valve-controlled discharge opening of said third container.

It is a still further object of my present invention to provide a combined brine shrimp hatchery and separating device which consists of a minimum of parts, is relatively cheap and easy to manufacture and assemble, is readily cleanable, is strong and durable, and is highly efficient in the purposes for which designed.

In the accompanying drawings, wherein for the purpose of illustration, I have shown several preferred embodiments of my present invention, Fig. 1 is a side perspective elevation of my present invention, Fig. 2 is a vertical sectional view, on a somewhat enlarged scale, of the form of my present invention shown in Fig. 1, this view being taken on the line 2—2 of Fig. 1, Fig. 3 is an enlarged, fragmentary sectional view on line 3—3 of Fig. 2, showing in partial section, a portion of the second and third containers of the apparatus and showing the valve arrangement for drawing off the newly-hatched shrimp from the third container, and Figs. 4 and 5 are vertical sectional views corresponding to the showing of Fig. 2 but showing two further modified forms of my present invention.

Referring more in detail to the accompanying drawings wherein like reference numerals have been employed to designate like parts throughout the several views, the numeral 1 designates an outer container preferably of cylindrical form provided with a removable and replaceable top or cover member 2 having near the center thereof a handle 3. A switch 4 to control the supply of electric current from a suitable source (not shown), is mounted within the container 1 with its operating handle 5 extending to the exterior of said container. An adjustable thermostat 6 of any conventional or preferred construction is mounted within the container 1 where it is subjected to temperatures existing within said container. Said switch 4 and thermostat 6 are included in an electric circuit (not shown), which circuit also includes therein an incandescent electric light bulb 7 which is preferably mounted in a suitable socket on the bottom wall of container 1 adjacent the inner surface of the vertical side wall thereof as clearly shown in the accompanying drawings. The thermostat 6, switch 4 and bulb 7 are so arranged that when the switch 4 is actuated to the "on" position, the bulb 7 is energized, which results in the heating of the interior of the container 1, which heating continues until the temperature reaches the maximum degree for which the adjustable thermostat 6 is set, whereupon said thermostat functions to deenergize the circuit and extinguish the bulb 7, which remains extinguished until thermostat 6 again "calls" for heat, whereupon the said thermostat again functions to close the circuit, energize the bulb 7 and to thus maintain the desired temperature of say 90° F. to 95° F. which has been determined to be the most effective temperature to hatch the brine shrimp eggs. The electric circuit and the arrangement of the switch, bulb and thermostat therein, are such that the thermostat 6 may be readily cut out of the circuit and energization and deenergization of the bulb effected solely by switch 4 and without control by thermostat 6. An aperture 8 extends through the side wall of the container 1 near the bottom thereof for a purpose to be hereinafter described, and in all forms of my invention other than that shown in Fig. 4, a second aperture 9 extends through the said side wall near the bottom thereof to permit the passage therethrough of an air supply pipe or hose to be hereinafter described.

Adapted for mounting within the outer container 1 of the form of my invention shown in Fig. 2, is a first container constituting the hatching section of my improved apparatus, which first container comprises a funnel-shaped body portion 10 disposed in vertical position and having at the top thereof and outwardly-extending flange 11 adapted to rest upon, and be supported by engagement with, the top edge of said outer container 1. The lower end of funnel-shaped body portion 10 terminates in a tubular portion 12 which constitutes the second container or settling section of the apparatus, which tubular portion is closed at its lower end except for a central aperture into which is inserted the inner end of a pipe or hose 13 under control of a valve 14, and which pipe or hose is connected at its outer end beyond valve 14 to a source of air pressure (not shown), said pipe or hose passing from the exterior of the outer container 1 to the interior thereof through aperture 9 in the lower side wall portion of said outer container. The entire first container or hatching section and the second container or settling section are made of brine-resisting opaque material, such as brine-resisting metal, opaque glass, opaque plastic, or the like.

Extending radially from second container 12 which constitutes the settling section of the apparatus, is a third container 15 which constitutes the separating section into which the newly-hatched brine shrimp "school," or gather, this third container being made of a tube of transparent or translucent, brine-resistant material such as glass, plastic, or the like, so that light emitted from bulb 7 will be visible through the wall thereof. The outer end of the third container 15 contacts the inner surface of the lower portion of the side wall of outer container 1 concentrically with respect to aperture 8, and a tubular member 16 of brine-resistant material is passed through said aperture and into the outer end of third container or separating section 15, and is frictionally retained therein, the outer end of tubular member 16 being closed by means of a centrally-apertured cap 17 through which passes the stem 18 of a reciprocating piston-type valve 19 having an external operating button or handle 20 by means of which said valve 19 is movable axially within the outer end of tubular member 16. Valve 19, when in the position shown in Fig. 3, prevents flow through a discharge pipe 21 which extends through the wall of tubular member 16, said valve 19 being manually movable outwardly of said tubular member 16 to a position adjacent the closed outer end thereof where it "clears" the inner end of discharge pipe 21 and permits flow through said discharge pipe.

In the form of my present invention shown in Fig. 4, the first container or hatching section of the apparatus, like the previously-described form thereof, comprises a funnel-shaped body portion 10, which communicates through a tubular section 12$^{111}$ with a hollow frusto-conical member 31 which constitutes the second container or settling section of the apparatus, the bottom of said frusto-conical member 31 being closed, and the third container or separating section 15 extending radially therefrom and being constructed and arranged in the manner described in connection with the previously described form of the invention. As an effective means for supplying air to the first container or hatching section of this form of the invention, and for preventing passage of the eggs and hatched shrimp from the first container or hatching section into the second container or settling section until such time as the hatching operation has been at least partially completed, I provide a tube 32 open at its upper end 33 and having its lower end 34 embedded in a stopper 35 of rubber, cork or the like, with a circumferentially-arranged series of openings 36 extending through the wall of the tube just above the upper surface of the stopper 35. Stopper 35 is of a size and configuration such that it will fit snugly within the discharge opening at the lower portion of the first container or hatching section and will cut off flow between said first container and the underlying second container or settling section. An air supply pipe or hose 37 extends through handle 3 and top or cover 2 and projects downwardly into the tube 32 where it terminates short of the upper surface of said stopper 35. The external diameter of pipe or hose 37 is considerably less than the internal diameter of tube 32 so that a space exists therebetween. A valve 38 is provided to control or regulate the flow of air from a source of air pressure (not shown) to the lower interior portion of the first container or hatching section.

In the form of my present invention shown in Fig. 5, the first container, the second container, and the third container of the apparatus correspond identically to corresponding parts of the apparatus illustrated and described in connection with Fig. 4. As an effective means for preventing passage of the eggs and hatched shrimp from the first container or hatching section into the second container or settling section until such time as the hatching operation has been at least partially completed, I provide a stopper 39 of a size and configuration such that it will fit snugly within the discharge opening in the lower portion of the first container or hatching section. It will be noted that stopper 39 is provided with a relatively small axial bore or passage 40 for a purpose to be hereinafter described.

Having thus described the important features of construction of the several forms of my present invention, I will now refer to the operation of these several forms and to the manner in which the several forms of apparatus function to hatch brine shrimp eggs and to separate the newly-hatched shrimp from the shells from which they are hatched. Referring to Fig. 2, the first step in the hatching and separating operation consists in assembling the first, second and third containers, 10, 12 and 15, respectively, within the outer container 1, connecting the air pipe or hose 13 to the lower portion of the second container or settling section 12, alining the outer end of the third container or separator section 15 with aperture 8, inserting the tube 16 through aperture 8 and into the outer end of the third container or separator section 15, and moving valve 19 to closed position with respect to discharge pipe 21. The third container or separating section, the second container or settling section and the first container or hatching section are then filled with a brine solution of proper predetermined strength, for example, a solution prepared by adding four or five tablespoons of salt to one gallon of water, this filling operation being effected by pouring the brine solution into the funnel-shaped container or hatching section until the level of the solution reaches about an inch from the top edge of said funnel-shaped container. The proper quantity of brine shrimp eggs is now dumped into the brine solution and the top or cover 2 applied to the outer container 1, which cover also closes the open top of the first container 10. Switch 4 having been connected to an electric supply circuit, switch handle 5 is moved to set the switch in the "on" position, whereupon bulb 7 is illuminated, thermostat 6 having been previously set to operate at a temperature sufficiently high to maintain the temperature of the brine solution and brine shrimp eggs within the first, second and third containers, at about 90° F. to about 95° F. Air supply valve 14 is now operated to effect aeration which drives off poisonous carbon dioxide and replenishes needed oxygen in the first, second and third containers, which air also serves to effect complete agitation and circulation of the brine shrimp eggs contained in the solution. In a relatively short time the temperature of the solution will be raised to the desired degree, say of the order of about 90° F. to 95° F., which temperature will be automatically maintained during the hatching period by operation of the thermostat 6. The hatching period is continued for a period of from fifteen to twenty-four hours, following which switch 5 is moved to "off" position and air supply valve 14 is closed. The top or cover 2 is then removed, and thermostat 6 is then cut out of the circuit between switch 5 and bulb 7 so that bulb 7 is no longer under the control of the thermostat, whereupon bulb 7 is reenergized by actuation of switch 4 and remains energized until manual operation of said switch to "off" position. As soon as the supply of air has been cut off, there is a natural tendency for the shells to float toward the top of the apparatus and for the newly-hatched shrimp to settle toward the bottom of the apparatus and into the second container or settling section. A settling period of say fifteen minutes or so is allowed for the newly-hatched shrimp to settle into the second container or settling section, from which section they "school" or swim into the third container or separating section into which they are attracted by the light emitted from bulb 7. A receptacle is then placed beneath the discharge outlet 21 with a thin, fine-mesh nylon net or filter overlying said receptacle, the valve 19 is moved to "open" position, and the newly-hatched brine shrimp are retained on the nylon net or filter and may be fed directly to the fish within an aquarium or container, or may be placed in a container with water to be subsequently fed to the fish. The steps just described, of permitting the newly-hatched shrimp to settle in the second container or settling section and to pass into the third container or separating section, and of draining off the newly-hatched shrimp from the third container or separating section, are repeated until the complete hatch has been removed from the apparatus, following which the apparatus is disassembled, is thoroughly cleaned, and is made ready for subsequent use.

When using the form of my invention shown in Fig. 4, the aqueous salt or brine solution is poured into the apparatus until it fills the second and third containers and fills the first container or hatching section to about an inch or so from the top thereof. The tube 32 to the lower end of which is attached the stopper 35, is then moved into the position shown in Fig. 4 wherein the stopper 35 blocks or cuts off communication between the first container or hatching section and the second container or settling section. Brine shrimp eggs are then immersed in the brine solution contained within the first container or hatching section, the pipe or hose 37 is inserted through the alined apertures in handle 3 and top or cover 2 and said pipe or hose 37 is moved downwardly within tube 32 with is lower end terminating above the upper surface of stopper 35 and above openings 36. When air supply valve 38 is opened to supply air to the first container or hatching section for aeration and agitation purposes, the pipe or hose 37 within tube 32 acts as an injector and causes the contents of the first container or hatching section to circulate out of tube 32, through openings 36, upwardly through the hatching section and then downwardly through the annular space between the outer surface of pipe or hose 37 and the inner surface of tube 32, thus insuring complete and continuous circulation of the contents of the hatching section. When the hatching operation has been at least partially completed, and it is desired to draw off some of the newly-hatched shrimp, the top or cover 2 is removed, carrying with it the pipe or hose 37, whereupon tube 32 and its attached stopper 35 may be lifted from the hatching section, to thus establish communication between the first and second containers. Otherwise, the operation is substantially the same as that described above in connection with other form of my present invention.

The operation of the Fig. 5 form of the invention corresponds substantially to that above described in connection with the Fig. 4 form thereof, the primary difference residing in the fact that instead of employing a solid stopper such as stopper 35, a removable stopper 39 is employed, which stopper is provided with a relatively small axial bore or passage 40, and is employed for partially cutting off communication between the first container or hatching section and the second container or settling section. After the Fig. 5 apparatus has been filled with the aqueous brine solution and brine shrimp eggs have been immersed therein, the valve 14 is opened and the air passing upwardly through the bore or passage 40 serves to prevent the eggs from passing downwardly from the first container or hatching section into the second container or settling section and also effects aeration and agitation of the contents of the first container. After the hatching operation has been at least partially completed and it is desired to draw off some of the newly-hatched brine shrimp, stopper 39 is readily removed by inserting a hooked or like instrument through the bore or passage 40 and lifting said stopper out of its illustrated position within the discharge opening of the first container or hatching section. Otherwise the operation is substantially the same as that described in connection with other forms of my present invention.

It will thus be seen from the foregoing description of the construction and operation of the several forms of my present invention, that I have fiulfiled the specified objects of my said invention and that I have provided a relatively simple, compact and highly efficient device for hatching brine shrimp eggs and for separating the newly-hatched shrimp from their shells.

It is to be understood that the several forms of my present invention shown and described herein are to be taken as preferred embodiments of the same and that various changes may be made in the shape, size and arrangement of parts without departing from the spirit of my invention or from the scope of the subjoined claims. It is also to be understood that while I have herein described my invention for use in the hatching of brine shrimp eggs and the separation of the shells from newly-hatched brine shrimp, my invention is not restricted to use in connection with the eggs of this particular shell fish, and finds equal utility as a means for hatching the eggs of other shellfish, fish and like animals.

Having thus described my invention, I claim:

1. A combined brine shrimp hatching and separating apparatus comprising a vertically-positioned first container for receiving an aqueous brine solution having brine shrimp eggs immersed therein, said first container constituting a hatching section for said shrimp eggs, a second container below and in communication with the lower portion of said first container and constituting a settling section for receiving by gravity flow said shrimp eggs from the said first container, a third container in communication with the lower portion of said second container and constituting a separating section for receiving newly-hatched shrimp from said second container, said third container having a valve controlled discharge opening through which the hatched shrimp may be removed therefrom, controllable air supply means in communication with said first container for supplying air under pressure thereto to aerate and agitate the contents thereof, and means associated with said first container and in heat exchange relation therewith for heating the contents thereof.

2. A combined brine shrimp hatching and separating apparatus as defined in claim 1, wherein said first, second and third containers are enclosed within an outer container, and wherein said third container and its valve-controlled discharge opening extend through the wall of said outer container for permitting removal of the newly-hatched brine shrimp from said third container.

3. A combined brine shrimp hatching and separating apparatus as defined in claim 1, wherein means are provided for controlling said heating means for the contents of said first container to establish and maintain said contents at a predetermined temperature.

4. A combined shrimp hatching and separating apparatus as defined in claim 1 wherein the heating means is an electrical heating means.

5. A combined shrimp hatching and separating apparatus as defined in claim 1 wherein the heating means is an electric incandescent light bulb.

6. A combined shrimp hatching and separating apparatus as defined in claim 1 wherein the heating means is an electrical heating means and wherein an electric thermostat is provided for controlling said electrical heating means.

7. A combined shrimp hatching and separating apparatus as defined in claim 1 wherein the heating means is an electric incandescent light bulb positioned in heat exchange relation with respect to said first container and wherein an electric thermostat is provided for controlling said bulb.

8. A combined brine shrimp hatching and separating apparatus comprising a vertically-positioned, funnel-shaped container for receiving an aqueous brine solution having brine shrimp eggs immersed therein, said container constituting a hatching section for said shrimp eggs, a second container below and in communication with the lower discharge end of said funnel-shaped container and constituting a settling section for receiving by gravity flow said shrimp eggs from said funnel-shaped container, a third container in communication with the lower portion of said second container and constituting a separating section for receiving newly-hatched shrimp from said second container, said third container having a valve controlled discharge opening through which newly-hatched shrimp may be removed therefrom, controllable air supply means in communication with said first container for supplying air under pressure thereto to aerate and agitate the contents thereof, and means associated with said funnel-shaped container and in heat exchange relation therewith for heating the contents thereof.

9. A combined brine shrimp hatching and separating apparatus as defined in claim 8 wherein the means for supplying air under pressure to said first container discharges initially into said second container through which the air passes into said first container.

10. A combined brine shrimp hatching and separating apparatus comprising a vertically-positioned first container for receiving an aqueous brine solution having brine shrimp eggs immersed therein, said container constituting a hatching section for said shrimp eggs, a second container below and in communication with the lower portion of said first container and constituting a settling section for receiving by gravity flow said shrimp eggs from said first container, said first and second containers being constructed of opaque material, a third container in communication with the lower portion of said second container and constituting a separating section for receiving newly-hatched shrimp from said second container, said third container having a controllable discharge opening through which newly-hatched shrimp may be removed therefrom, said third container being constructed of light transmitting material whereby newly-hatched shrimp are attracted thereinto, controllable air supply means in communication with said first container for supplying air under pressure thereto to aerate and agitate the contents thereof, and means associated with said first container and in heat exchange relation therewith for heating the contents thereof.

11. A combined brine shrimp hatching and separating apparatus as defined in claim 10 wherein a source of light is provided adjacent said light transmitting third container, which light is effective to cause said newly-hatched shrimp to gather in said light transmitting third container from said second container.

12. A combined brine shrimp hatching and separating apparatus comprising a vertically-positioned first container for receiving an aqueous brine solution having brine shrimp eggs immersed therein, said container constituting a hatching section for said shrimp eggs, a second container below and in communication with the lower portion of said first container and constituting a settling section for receiving by gravity flow said shrimp eggs from said first container, a third container in communication with the lower portion of said second container and constituting a separating section for receiving newly-hatched shrimp from said second container, said third container having a controllable discharge opening through which the newly-hatched shrimp may be removed therefrom, controllable air supply means in communication with said first container for supplying air under pressure therethrough to aerate and agitate the contents thereof, an outer container of opaque material enclosing said first, second and third containers, and an incandescent bulb within said outer container and adjacent said first container in heat exchange relation therewith for heating the contents of said first container and also adjacent said light transmitting third container effective to cause the newly-hatched shrimp to be attracted into said third container from said second container.

References Cited in the file of this patent

UNITED STATES PATENTS

| | | |
|---|---|---|
| 933,764 | Krawchenko | Sept. 14, 1909 |
| 2,299,053 | Ferris | Oct. 13, 1942 |
| 2,376,064 | Knapp | May 15, 1945 |
| 2,628,590 | Wood | Feb. 17, 1953 |
| 2,776,642 | Sepersky | Jan. 8, 1957 |
| 2,804,045 | Scott | Aug. 27, 1957 |
| 2,829,584 | Jepson | Apr. 8, 1958 |